INVENTOR.
ARTHUR H. YOUMANS
BY James Y. Cleveland
ATTORNEY

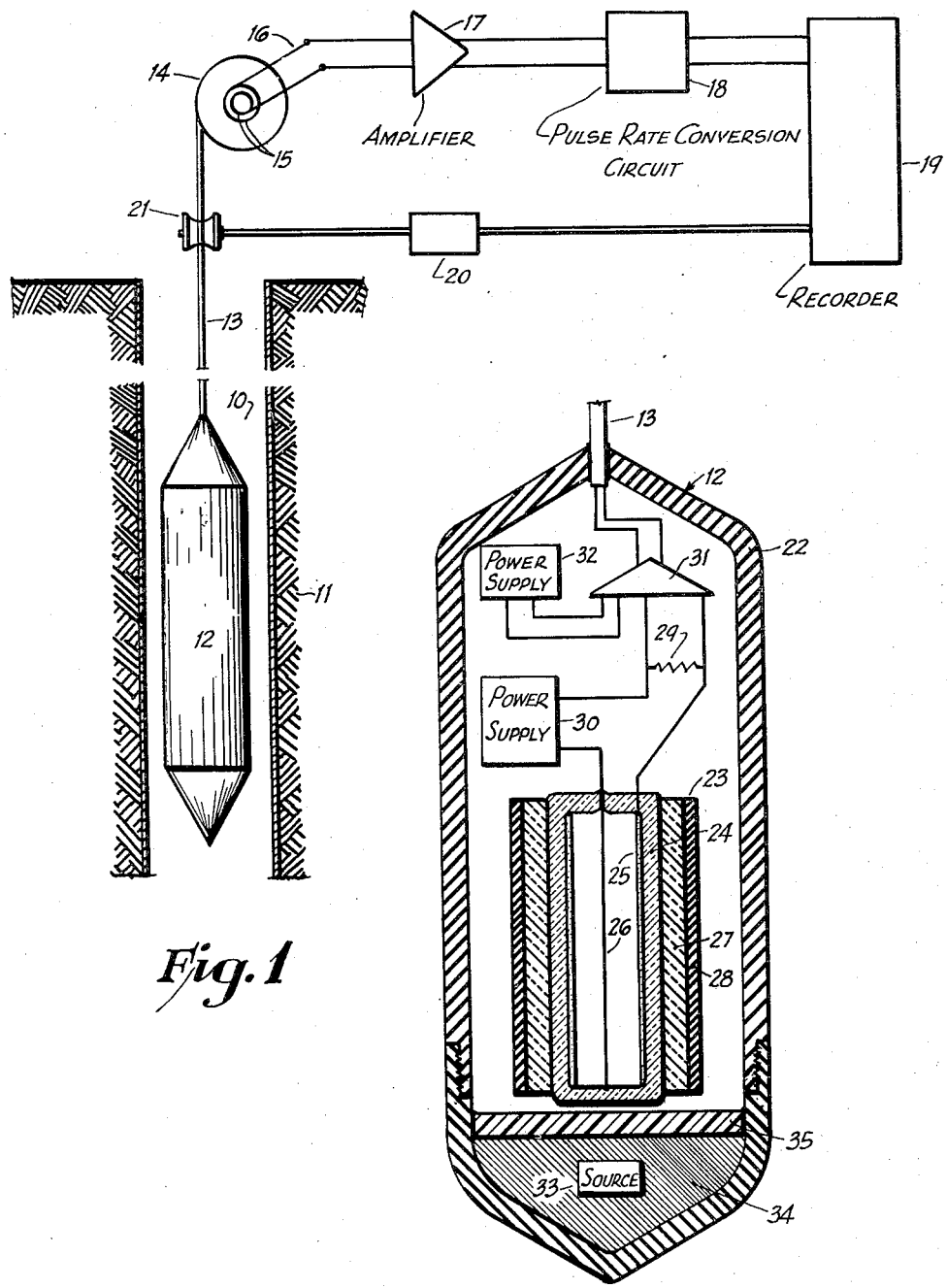

United States Patent Office 2,854,584
Patented Sept. 30, 1958

2,854,584

APPARATUS FOR THE SELECTIVE DETECTION OF NEUTRONS

Arthur H. Youmans, Tulsa, Okla., assignor to Well Surveys, Incorporated, Tulsa, Okla., a corporation of Delaware Application August 2, 1952, Serial No. 302,394

5 Claims. (Cl. 250—71)

This invention relates to the art of geophysical prospecting and more particularly to the art of radioactivity well-logging wherein a Geiger counter is used which is made sensitive to neutrons and insensitive to gamma rays.

It is old in the art to log oil wells by irradiating the strata adjacent the drill hole with fast neutrons and traversing the well with a gamma ray or neutron detector or both. The neutrons interact with the atoms of the formations whereby gamma rays are produced and incident neutrons are scattered. Both gamma rays and scattered neutrons reach the drill hole as a result of the neutron bombardment of the formations, and it is desirable to detect the presence of one type of radiation without interference from the other. This invention comprises a method and apparatus for detecting neutrons present without interference from gamma rays. Gamma rays are conventionally eliminated by shielding of heavy metal, which freely passes neutrons but stops gamma rays. In the restricted space available in a well-logging instrument, it is not possible to use sufficient shielding to stop all gamma rays, and it is therefore necessary to employ a detector which is sensitive to neutrons but relatively insensitive to gamma rays.

In the prior art, gamma rays and neutrons have been detected together and signals indicative of each electronically separated on the basis of electrical pulse height. In this invention, neutrons produce pulses in the detector, and gamma rays do not; no electronic separation is necessary.

In the method of this invention, incident neutrons react with nuclei of lithium, boron, uranium, or hydrogen, with the subsequent production of heavy particles which cause scintillation material to emit light; this light impinges upon a photo-sensitive cathode and produces photo-electrons which discharge a Geiger tube. The apparatus is arranged to be very inefficient in the detection of gamma rays, and thereby neutrons are detected to the exclusion of gamma rays.

Neutrons are not directly detectable. In order to detect neutrons it is necessary to provide material to react with neutrons to produce detectable radiation. In the event that this detectable radiation is other than gamma radiation, it is possible to distinguish between the gamma rays and this detectable radiation. In particular, upon capturing neutrons, lithium and boron emit alpha rays, and uranium undergoes fission. Fast neutrons react with hydrogen to produce recoil protons. These alpha particles, fission fragments and recoil protons may be distinguished from gamma rays. Certain materials emit flashes of light when struck by alpha particles, fission fragments, or recoil protons. The same materials emit flashes of light when struck by gamma rays. However, the intensity of the light flashes or scintillations depends upon the energy released by the impinging particles of radiation within the material. Fission fragments, alpha particles, and recoil protons are readily stopped in a very short distance in a solid material, and consequently, all of the energy of the alpha particles, fission fragments, and recoil protons is used to produce light. Gamma rays which strike atoms of scintillation material thereby produce electrons which in turn cause the scintillation material to emit flashes of light. The gamma rays and these electrons are more penetrating than the alpha particles, fission fragments, or recoil protons and require a greater thickness of scintillation material for all of the energy to be released within the material. Consequently, if a relatively thin section of scintillation material is used, very little light is produced by gamma rays; indeed, most gamma rays pass through without producing any light at all. By distinguishing between small and large flashes of light, it is possible to differentiate between those resulting from incident neutrons and those resulting from gamma rays. In this invention this is accomplished by the use of a photo-sensitive Geiger counter. The light flashes are composed of a number of photons which may strike the photo-surface of the photo-sensitive Geiger counter and release photo-electrons which discharge the Geiger tube. The efficiencies of light collection and of the photo surface are arranged so that only occasionally do the photons produce a Geiger discharge. Thus, the small light flashes resulting from incident gamma rays represent relatively few photons and are insufficient to produce Geiger discharges except occasionally, whereas the much stronger light flashes resulting from the incident neutrons represent many photons and produce Geiger discharges frequently. Thus the number of discharges of the Geiger counter is indicative of the number of incident neutrons.

Gamma rays striking the photo surface may produce Geiger discharges as in an ordinary Geiger counter. Since these are indistinguishable in a single counter from the Geiger discharges occasioned by light flashes produced by neutrons, a coincidence arrangement is used to distinguish between such discharges. Thus, if two photo-sensitive Geiger counters are disposed to receive light from the scintillation material, light from a scintillation may produce Geiger discharges in both counters simultaneously, whereas, a Geiger discharge produced by an incident gamma ray can occur in only one photo-sensitive Geiger counter. Coincident discharges are more unlikely for the weak flashes of light occasioned by gamma rays than for the relatively strong flashes of light occasioned by neutrons, thus coincident discharges in two or more photo-sensitive Geiger counters discriminates between neutron pulses and gamma ray pulses.

Therefore, the primary object of this invention is to provide a method and apparatus for making a well log by selectively detecting neutrons. Another object of the invention is to adapt a Geiger counter for selective detection of neutrons in the presence of gamma rays. Still another object is to provide a scintillation medium which is sensitive to neutrons but relatively insensitive to gamma rays. Other objects and advantages of the present invention will become apparent from the following detailed description when considered in conjunction with the accompanying drawings, in which:

Figure 1 is a diagrammatic illustration of a geophysical well-logging operation;

Figure 2 is an enlarged vertical sectional view of one form of the subsurface instrument;

Figures 3, 4:
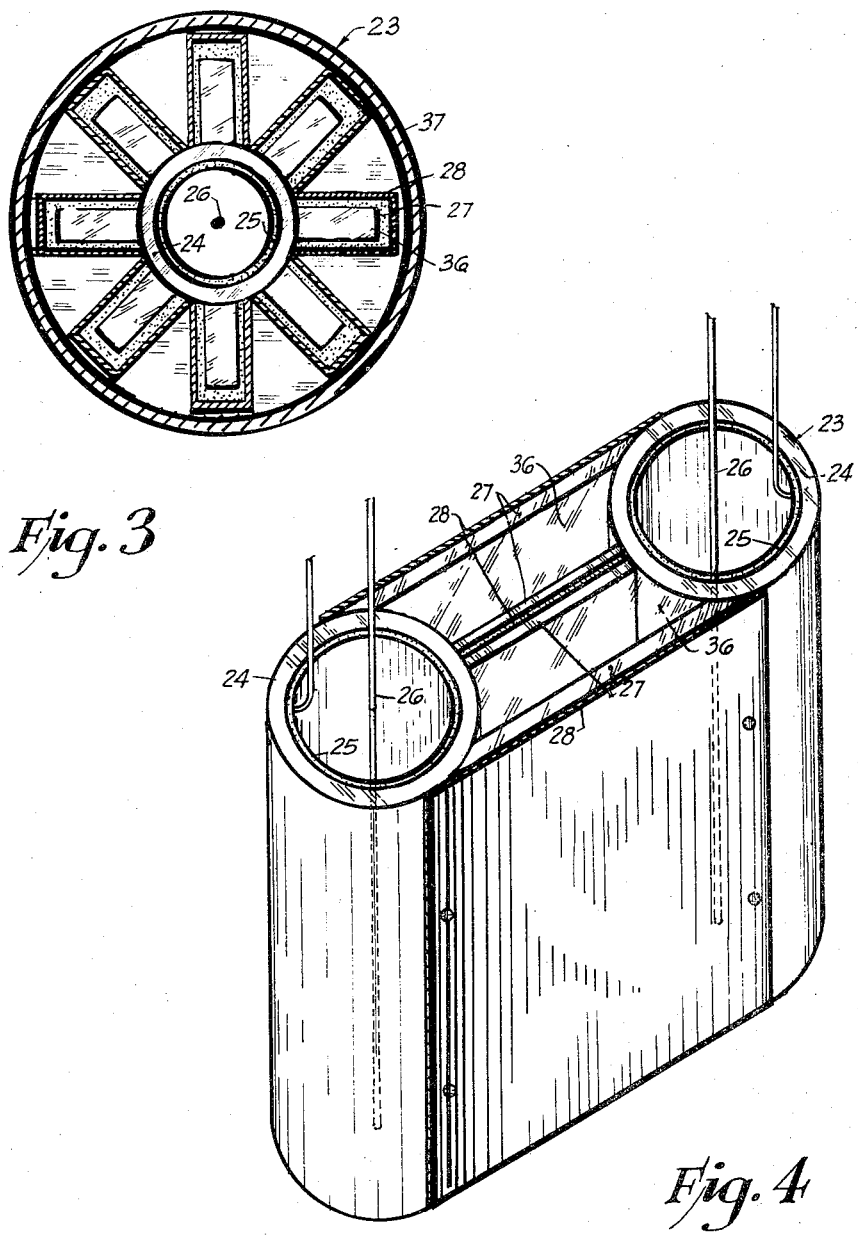
Figure 3 shows a horizontal sectional view of a modified form of the detector shown in Figure 2.
Figure 4 shows a horizontal sectional view of another modified form of the detector shown in Figure 2 adapted for coincidence detection.

In Figure 1 of the drawings, there is illustrated a well surveying operation utilizing the method of this invention. A well 10 penetrates the earth's surface 11 and may or may not be cased. Disposed within the well is subsurface instrument 12 of the well-logging system. Cable 13 suspends the instrument 12 in the well, and electrically connects the instrument with the surface apparatus. The cable is wound on or unwound from drum 14 in raising and lowering instrument 12 to traverse the well. Through slip rings 15 and brushes 16 on the end of the drum, the cable is electrically connected to amplifier 17. A signal arising in the subsurface instrument 12 is amplified by the amplifier 17 and transmitted to pulse rate conversion circuit 18 which functions in a conventional manner to produce a direct-current voltage which varies in magnitude in accordance with the rate of occurrence of pulses applied to it. The direct-current voltage is recorded by recorder 19. Recorder 19 is driven through transmission 20 by measuring reel 21 over which cable 13 is drawn so that recorder 19 moves in correlation with depth as instrument 12 traverses the well.

Subsurface instrument 12, shown in Figure 1, may take the form illustrated diagrammatically in vertical section in Figure 2. Instrument 12 comprises a housing 22 which encloses detector 23. Detector 23 comprises wall 24 which encloses a Geiger counter atmosphere. The inside of wall 24 is coated with photo-cathode 25. Anode wire 26 lies axially within the chamber defined by wall 24. Scintillation material 27 is disposed about the outside of wall 24 and neutron reactive material 28 is disposed about scintillation material 27. Voltage is applied between anode 26 and photo-cathode 25 through resistance 29 from power supply 30. The output of detector 23 appears across resistor 29, is amplified by amplifier 31, and is sent to the surface through cable 13. Amplifier 31 is supplied with power from power supply 32. Instrument housing 22 also encloses neutron source 33. If source 33 emits both neutrons and gamma rays, high density gamma ray absorber 34 is disposed about source 33 to eliminate gamma rays. A neutron absorbing shielding 35 is disposed between source 33 and detector 23 to prevent direct passage of neutrons from source to detector.

In conducting a survey of a drill hole while using the apparatus illustrated in Figure 2, the instrument 12 is caused to traverse the formations penetrated by the well. Neutrons emitted from source 33 irradiate the formations. Interactions between these neutrons and the nuclei of atoms in the formations scatter some of the neutrons back into the bore hole where they may be detected by detector 23. Neutron interactions in the formation also produce gamma rays which also strike detector 23; however, detector 23 is selectively sensitive to neutrons. Neutrons scattered from the formations strike neutron reactive material 28 which may be made of lithium, boron, uranium, or hydrogen or their compounds. Lithium and boron capture slow neutrons and thereupon emit alpha rays. Uranium undergoes fission following neutron capture. Fast neutrons react with hydrogen to produce recoil protons. The particles emitted from neutron reactive material 28 following neutron reaction enter scintillation material 27 and produce flashes of light therein. This scintillation material may be sodium chloride containing a small amount of silver chloride. Other scintillation material such as activated sodium iodide, activated zinc sulfide, or activated calcium iodide may be used. If activated lithium iodide is used for scintillation material 27, a separate neutron reactive material 28 need not be used. The neutron reactive material may also be otherwise dispersed within the scintillation material, e. g., boron phosphate may be mixed with activated zinc sulfide. This light passes through wall 24 and strikes photo-cathode 25 which thereupon emits photo-electrons. Wall 24 must be made of a material, such as quartz, which is transparent to the light emitted in scintillation material 27. Photo-cathode 25 is very thin, of the order of a few atoms in thickness, in order that light may pass through the photo-cathode and strike the atoms on its inner surface to knock off photo-electrons. The gas within the chamber defined by wall 24 may be any conventional Geiger counter filling such as the self-quenching mixture of argon and chlorine. The photo-electrons from photo-cathode 25 are accelerated toward anode 26. These electrons ionize the gas producing other electrons which are also accelerated toward anode 26 and which produce further ionization. As in a conventional Geiger counter, a pulse is produced which is independent of the number of the initial ionizing electrons. In order that detector 23 be insensitive to impinging gamma rays, scintillation material 27 is of the order of 0.1 mm. thickness, depending upon the material. This is thick enough to stop particles emitted by neutron reactive material 28 following neutron reaction; however, it is so thin as to be virtually transparent to gamma rays, and even when gamma rays produce electrons within the scintillation medium, these electrons are very little impeded by the scintillation material and pass therefrom without producing an appreciable amount of light. The efficiency of light collection and the efficiency of the photo-cathode 24 are so low that only infrequently do light photons arising in the scintillation material 27 produce Geiger discharges. The efficiency of light collection at the photo-cathode may be adjusted by the insertion of appropriate light filters between the scintillation material and the photo-cathode should lower efficiency be necessary. Therefore, a Geiger discharge is unlikely from a small flash of light comprising few photons whereas the relatively large flashes of light resulting from neutron bombardment are likely to produce a Geiger discharge every time. The number of Geiger discharges is indicative of the number of neutrons from source 33 which are scattered back to the bore hole by the formations. These Geiger discharges produce voltage pulses across resistor 29. These voltage pulses are amplified and sent to the surface where they are further amplified and converted into a direct-current voltage proportional to the number of voltage pulses. This direct-current voltage is therefore indicative of the number of neutrons returning to the bore hole from the formation. This voltage is recorded on recorder 19 in correlation with the depth in the well at which detection occurs, thus producing a neutron-neutron well log.

In Figure 3 there is illustrated in horizontal section another form of detector 23 in which the detector is made more efficient by increasing the area of the neutron reactive material 28 and scintillation material 27. The scintillation material 27 is still of the order of 0.1 mm. thickness; however, light from the scintillation material does not pass directly through the wall 24 but first passes through transparent material 36. Transparent material 36 may form a number of flat plates radiating from wall 24. Thus, the light arising in scintillation material 27 may efficiently reach photo-cathode 25.

In Figure 4, there is illustrated in a horizontal sectional view another form of detector 23 employing two Geiger counters in coincidence. Scintillation material 27 is arranged so that light arising therein may reach both photo-cathodes 25. The output circuits are arranged in a conventional manner so that an output pulse is produced only when both Geiger counters discharge simultaneously. The arrangement shown in Figure 4 eliminates from the output signal those Geiger discharges produced by gamma rays in the fashion of a conventional Geiger counter. Were it not for the coincidence arrangement gamma rays striking the photo-cathode would produce a discharge and thus an output pulse. Additionally, other spurious Geiger discharges, such as those produced by the thermal emission of electrons from the photo-cathode, are eliminated from the output pulses.

Since the sensitivity is such that one Geiger discharge is unlikely, it is extremely unlikely that two Geiger discharges will be instituted by the same weak light pulse. Therefore, the coincidence arrangement shown in Figure 4 increases the discrimination against the weak light flashes produced in the scintillation material by gamma rays. In fact, the discrimination factor will be the product of the discrimination factors of the respective counters. It may thus be seen that an arrangement of three or more counters in coincidence may be employed to further increase the degree of discrimination between neutrons and gamma rays, the discrimination factor being the product of the individual factors for each counter in the aggregate. Clearly this is an advantage since if for a single counter the discrimination factor were only five (i. e., equal numbers of gamma ray and neutron induced scintillations would result in one gamma ray pulse for each five neutron pulses) then two counters in coincidence would have a factor of twenty-five. An aggregate of three would have a factor of 125.

It is to be understood that this invention is not to be limited to the specific modifications described but is to be limited only by the following claims.

I claim:

1. Apparatus for detecting neutrons in the presence of gamma rays comprising neutron reactive scintillation means adapted to produce heavy ionizing particles when bombarded with neutrons and at least the scintillation portion of said means being of such thickness that heavy ionizing particles cause strong scintillations therein and gamma rays cause weak scintillations therein, and photosensitive Geiger counter means exposed to said scintillation means, said counter means being sensitive substantially only to strong scintillations for producing electrical pulses indicative of the incident neutrons.

2. In radioactivity well-logging wherein the formations surrounding a drill hole are irradiated by a source of neutrons and neutrons are thereby scattered back to said drill hole accompanied by natural gamma rays, gamma rays arising in said source of neutrons and gamma rays produced by said neutrons in said formations, means for detecting neutrons in the presence of gamma rays, said means comprising a neutron reactive material that is adapted to produce heavy ionizing particles when bombarded with neutrons, scintillation material adapted to detect said heavy ionizing particles, said scintillation material being of such thickness that heavy ionizing particles cause strong scintillations whereas gamma rays cause weak scintillations, a photosensitive Geiger counter exposed to said scintillation material, said counter being sensitive substantially only to strong scintillations for producing electrical pulses when subjected to the strong scintillations indicative of incident neutrons.

3. In radioactivity well-logging wherein the formations surrounding a drill hole are irradiated by a source of neutrons and neutrons are thereby scattered back to said drill hole accompanied by natural gamma rays, gamma rays arising in said source of neutrons and gamma rays produced by said neutrons in said formations, means for detecting neutrons in the presence of gamma rays, said means comprising a neutron reactive material selected from the group consisting of boron, lithium, uranium, and hydrogen; each member of said group being adapted to produce heavy ionizing particles when bombarded with neutrons; scintillation material adapted to detect said heavy ionizing particles; said scintillation material being of the order of 0.1 mm. thick such that heavy ionizing particles cause strong scintillations whereas gamma rays cause weak scintillations; a photosensitive Geiger counter exposed to said scintillation material, said counter being sensitive substantially only to strong scintillations for producing electrical pulses when subjected to the strong scintillations indicative of incident neutrons.

4. In radioactivity well-logging wherein the formations surrounding a drill hole are irradiated by a source of neutrons and neutrons are thereby scattered back to said drill hole accompanied by natural gamma rays, gamma rays arising in said source of neutrons and gamma rays produced by said neutrons in said formations, means for detecting neutrons in the presence of gamma rays, said means comprising a photo-sensitive Geiger counter; light conducting means projecting from said photo-cathode; scintillation material disposed adjacent said light conducting means so that light arising in said scintillation material may reach said photo-cathode, said scintillation material being of the order of 0.1 mm. thick such that heavy ionizing particles cause strong scintillations whereas gamma rays cause weak scintillations; neutron reactive material that is adapted to produce heavy ionizing particles when bombarded with neutrons and disposed adjacent said scintillation material whereby neutrons incident upon the neutron reactive material will be evidenced by electrical pulses given out by the photo-sensitive Geiger counter.

5. In radioactivity well-logging wherein the formations surrounding a drill hole are irradiated by a source of neutrons and neutrons are thereby scattered back to said drill hole accompanied by natural gamma rays, gamma rays arising in said source of neutrons and gamma rays produced by said neutrons in said formations, means for detecting neutrons in the presence of gamma rays, said means comprising neutron reactive material that is adapted to produce heavy ionizing particles when bombarded with neutrons, scintillation material for detecting said heavy ionizing particles, said scintillation material being of such thickness that heavy ionizing particles cause strong scintillations whereas gamma rays cause weak scintillations, a plurality of photosensitive Geiger counters exposed to said scintillation material, said counters being sensitive to strong scintillations for producing electrical pulses when subjected to the strong scintillations but relatively insensitive to the weak scintillations, and means associated with said Geiger counters for deriving output pulses therefrom only when a plurality of said Geiger counters produce pulses simultaneously, whereby random thermal pulses and gamma ray pulses produced directly in said Geiger counters are eliminated and pulses produced by weak scintillations caused by gamma rays substantially reduced.

References Cited in the file of this patent

UNITED STATES PATENTS

| | | |
|---|---|---|
| 2,351,028 | Fearon | June 13, 1944 |
| 2,508,772 | Pontecorvo | May 23, 1950 |
| 2,617,955 | Mandeville et al. | Nov. 11, 1952 |
| 2,648,012 | Scherbatskoy | Aug. 4, 1953 |